United States Patent
Harris et al.

(10) Patent No.: US 6,567,202 B2
(45) Date of Patent: *May 20, 2003

(54) WAVELENGTH COMPENSATION IN A WSXC USING OFF-VOLTAGE CONTROL

(75) Inventors: J. Michael Harris, Elmira, NY (US); Robert G. Lindquist, Elmira, NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 106 days.

(21) Appl. No.: 09/429,135

(22) Filed: Oct. 28, 1999

(65) Prior Publication Data

US 2002/0105712 A1 Aug. 8, 2002

Related U.S. Application Data

(60) Provisional application No. 60/129,798, filed on Apr. 16, 1999.

(51) Int. Cl.[7] .............................. G02F 1/03; G02F 1/133
(52) U.S. Cl. .............................. 359/249; 349/18; 349/33
(58) Field of Search ................................. 359/245, 249; 349/18, 33–35, 37, 72, 73, FOR 126, FOR 128, 75, 76

(56) References Cited

U.S. PATENT DOCUMENTS

| | | | |
|---|---|---|---|
| 3,921,162 A | 11/1975 | Fukai et al. ........... | 340/324 M |
| 4,128,311 A | 12/1978 | Smith et al. ........... | 349/19 |
| 4,394,069 A | 7/1983 | Kaye ..................... | 349/18 |
| 4,460,247 A | 7/1984 | Hilsum et al. ......... | 349/20 |
| 4,506,956 A * | 3/1985 | Dir ........................ | 349/33 |
| 4,582,396 A | 4/1986 | Bos et al. ............... | 349/180 |
| 4,625,163 A | 11/1986 | Germer ................. | 324/103 R |
| 4,834,504 A | 5/1989 | Garner .................. | 349/19 |
| 4,848,877 A | 7/1989 | Miller ................... | 349/184 |
| 5,247,378 A | 9/1993 | Miller ................... | 349/18 |
| 5,414,540 A | 5/1995 | Patel et al. ............ | 359/39 |
| 5,841,500 A | 11/1998 | Patel ..................... | 349/141 |

FOREIGN PATENT DOCUMENTS

WO    WO 98/34152    8/1998

* cited by examiner

Primary Examiner—Huy Mai

(57) ABSTRACT

A tunable liquid crystal switch is disclosed. An electronic controller provides an electronic drive scheme for achieving low intra-channel crosstalk of less than −40 dB using only electronic compensation. A cross-talk less than −50 dB is provided by combining coarse temperature tuning and electronic compensation. This is acheived by designing the thickness of the liquid crystal device to cause a minimum to occur at a wavelength longer than a longest operating wavelength and at a temperature greater than a maximum operating temperature. This ensures that the liquid crystal device is tunable over all operating wavelengths and temperatures using electronic compensation.

63 Claims, 12 Drawing Sheets

WAVELENGTH COMPENSATION IN A WSXC USING OFF-VOLTAGE CONTROL

This application claims the benefit of priority under 35 U.S.C. §119(e) for U.S. Provisional Patent Application Serial No. 60/129,798 filed on Apr. 16, 1999, the content of which is relied upon and incorporated herein by reference in its entirety.

BACKGROUND OF THE INVENTION

1. Field of the Invention

The present invention relates generally to optical switches, and particularly to liquid crystal optical switches.

2. Technical Background

Twisted (TN) and Supertwist (STN) nematic liquid crystal devices are well known and can be found in numerous applications. The most prevalent use of TN/STN devices is in the area of displays; however, these devices have been proposed for optical communications applications.

The nematic liquid crystal cells include alignment layers that cause the liquid crystal molecules to form a 90° helix. The helix functions as a waveguide. When no voltage is applied a polarized light signal is rotated by approximately 90° by adiabatic following. When power is applied to the cell, the helical alignment of the liquid crystal molecules is disrupted and the polarized light signal passes through the cell without being rotated.

In order for optical switches or wavelength selective cross-connect devices to be feasible, they must exhibit low intra-channel crosstalk. The maximum amount of cross-talk that can be tolerated is about −35 dB. System designers are specifying systems having cross-talk that is less than −40 dB. The measure of cross-talk in an LC cell sandwiched between parallel polarizing plates is the transmissivity.

The transmissivity and its reciprocal, the extinction ratio, is directly related to the degree of rotation provided by the helix in the LC cell. An LC cell that perfectly rotates a polarized light signal by 90° would have zero transmissivity and an infinite extinction ratio. This is known as the "minimum condition" and will be discussed in more detail below. However, for all practical purposes, cells having a perfect 90° helix do not exist. Thus, as discussed above, LC cells rotate a polarized light signal an amount approximately equal to 90°. When an orthogonally polarized light signal, for example, is rotated by the LC cell, the majority of the signal becomes a parallel polarized signal. However, because the rotation isn't a perfect 90°, an orthogonal component remains. The orthogonal component is transmitted by the cell and is intra-channel cross-talk in the communications channel. Obviously, the results are similar when the input signal is a parallel polarized signal; a parallel component will remain.

In one approach that has been considered, a wedged-shaped nematic liquid crystal cell was employed in an optical switch. The switch included a wedge-shaped cell which was disposed perpendicular to the light beam. During use, the effective thickness of the cell was varied to obtain a minimum condition by sliding the wedge-shaped cell along a direction perpendicular to the beam. This approach has serious drawbacks. Since the minimum condition (see equation (2) below) is wavelength dependent, a different thickness is required for the minimum condition for each wavelength channel. The task of designing a multi-cell liquid crystal array wherein each cell has a different thickness or wedge shape is impractical. This is exacerbated by the need for a different mechanical actuator for each cell. Because of these factors, this design is limited to a few wavelengths at most. Another drawback is reliability of the design. It uses mechanical movement of the cell for tuning a cell into minimum condition. Moving parts experience fatigue and ultimately fail.

Thus, a need exists for an optical switch or wavelength selective cross-connect (WSXC) having an array of LC cells that are individually and dynamically tunable to provide an acceptable level of cross-talk. A need exists for an LC device that can be tuned without moving the cells or the light beam itself. In addition, a need exists for a device that can support many wavelength channels.

SUMMARY OF THE INVENTION

The present invention addresses the needs discussed above. A tunable liquid crystal switch that achieves an intra-channel crosstalk of less than −40 dB using only electronic compensation is disclosed. A cross-talk less than −50 dB is provided by combining coarse temperature tuning and electronic compensation. This is acheived by designing the thickness of the liquid crystal device to cause a minimum condition to occur at a maximum operating wavelength and a maximum temperature. Thus, the liquid crystal device is tunable over all operating wavelengths and temperatures using electronic compensation.

One aspect of the present invention is an optical device for directing a light signal. The optical device includes a liquid crystal element for modulating the light signal, wherein the liquid crystal element is characterized by an extinction ratio when in an off-state. The optical device also includes a voltage controller connected to the liquid crystal element, wherein the voltage controller supplies a bias voltage to the liquid crystal element in the off-state to drive the extinction ratio toward a minimum condition.

In another aspect, the present invention includes a method of directing a light signal in an optical device. The optical device includes a liquid crystal element for switching the light signal. The liquid crystal element is characterized by an extinction ratio when in an off-state. The method includes the steps of providing a voltage controller connected to the liquid crystal element to supply the liquid crystal element with bias voltages, and the step of supplying a bias voltage to the liquid crystal element in the off-state to drive the extinction ratio toward a minimum condition.

In another aspect, the present invention includes a method of fabricating an optical device for directing a light signal. The method includes the step of providing a liquid crystal element for switching the light signal, the liquid crystal element having a thickness "d" which causes a minimum condition of an extinction ratio to occur at a longest operating wavelength of the light signal and at a temperature greater than a maximum operating temperature of the optical device. The method also includes the step of providing a voltage controller connected to the liquid crystal element, wherein the voltage controller supplies a bias voltage to the liquid crystal element in the off-state to drive the extinction ratio toward the minimum condition for operating wavelengths shorter than the longest operating wavelength, and for temperatures lower than the maximum operating temperature.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

Figure 1:
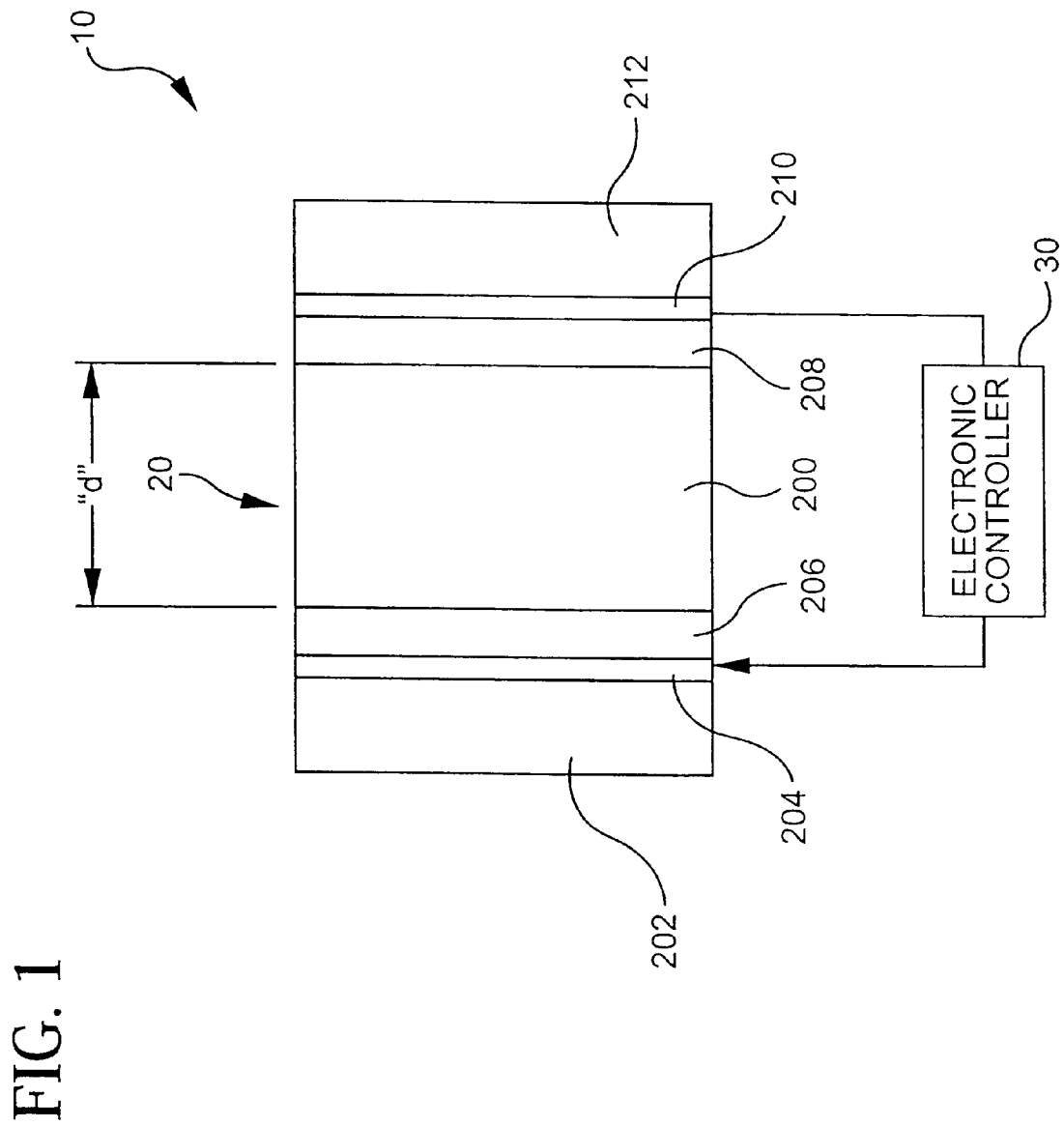
FIG. 1 is a schematic view of the tunable liquid crystal switch in accordance with the first embodiment of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the first of the present invention is shown in FIG. 1, and is designated generally throughout by reference numeral 10.

In accordance with the invention, the present invention for a tunable liquid crystal switch 10 includes electronic controller 30 which provides an electronic drive scheme for achieving low intra-channel crosstalk less than −40 dB using only electronic compensation. A cross-talk less than −50 dB is provided by combining coarse temperature tuning and electronic compensation. An optical monitor is also provided to monitor intra-channel cross-talk to maintain low intra-channel crosstalk.

As embodied herein and depicted in FIG. 1, a schematic view of tunable liquid crystal switch 10 is disclosed. Switch 10 includes Liquid Crystal (LC) cell 20 connected to electronic controller 30. One salient feature of the present invention relates to the design of LC cell 20. LC cell 20 includes glass sheets 202 and 212 which are used for both their light transmission characteristics and as a casing for the components of the cell. Electrodes 204 and 210 are formed on the interior of glass sheets 202 and 212, respectively. Dielectric alignment layers 206 and 208 are disposed on electrodes 204 and 206, respectively. Nematic liquid crystal material 200 is disposed between layers 206 and 208. Electrodes 204 and 210 are electrically connected to electronic controller 30, as well. One of ordinary skill in the art will recognize that the surfaces of alignment layers 206 and 208 cause the liquid crystal molecules to align and form a helix having a twist of approximately 90°. As discussed in the Background of the Invention above, the helix performs a waveguiding function. The thickness "d" of the liquid crystal material 200 disposed between alignment layers 206 and 208 is of great importance in the design of the present invention.

There are situations wherein the parameters of LC cell 20 can be manipulated to obtain a minimum condition wherein theoretically, the extinction ratio can approach infinity. For a 90° TN LC cell sandwiched between a parallel polarizer, the transmissivity is given by:

$$T = \frac{I_{out}}{I_{in}} = \frac{\sin^2\left[\frac{\pi}{2}\sqrt{1+u^2}\right]}{1+u^2} \tag{1}$$

wherein the factor u is given by:

$$u = 2\frac{d}{\lambda}\Delta n \tag{2}$$

where d is the cell thickness shown in FIG. 1, λ is the wavelength, and Δn is the LC birefringence. From equation 1, it is clear that the transmissivity becomes smaller as u increases. However, it only assumes a zero value under discrete conditions that satisfy:

$$\left[\frac{\pi}{2}\sqrt{1+u^2}\right] = m\pi, \quad \text{wherein } m = 1, 2, 3... \tag{3}$$

Figure 2:
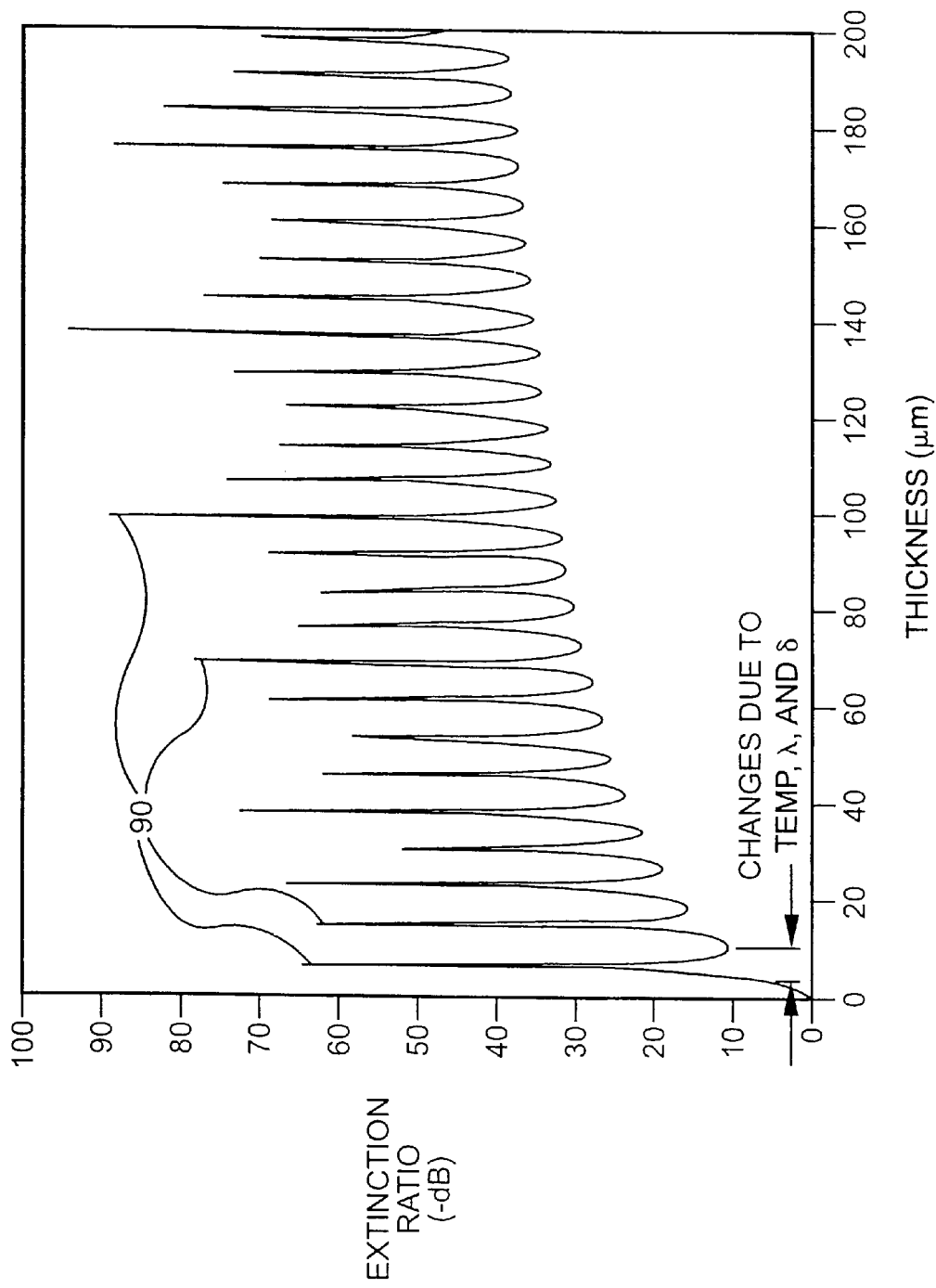
FIG. 2 is a plot of the extinction ratio versus the thickness of the liquid crystal cell illustrating the minimum conditions.

As embodied herein and depicted in FIG. 2, a plot of the extinction ratio versus the thickness of the liquid crystal cell illustrates the importance of proper LC cell design. As shown in FIG. 2, the extinction ratio for minimum conditions 90 can, in practice, range between 50 dB to over 90 dB. Minimum conditions 90 occur when equation (3) is true. Thus, if LC cell 20 can be maintained in a minimum condition, or thereabout, the low crosstalk (low transmissivity-high extinction ratio) needed in liquid crystal switch 10 will be achieved. Several barriers exist to building and maintaining LC cell 20 at the minimum condition. First, the manufacturing process for the cell thickness is not precise. Second, the birefringence, Δn, is highly dependent on temperature. Third, each wavelength/channel in a multi-wavelength system must be tuned separately. If LC cell 20 is designed properly, these barriers can be overcome via electronics.

For the electronic compensation to work, LC cell 20 must be designed with an appropriate thickness "d," such that a minimum condition for the longest operating wavelength occurs at a temperature just above the maximum operating temperature. This is very important to ensure voltage tunability over all wavelength and operating temperatures. Note that one could design the LC cell 20 to the first, second or any minimum condition and achieve similar results. Then, each channel in the "off" state, an ac signal with a RMS voltage, $V_{off,RMS}(\lambda_n, T)$, can be applied to tune the cell to the minimum condition for its wavelength and temperature. The type of ac waveform is not critical since the LC cell responds to the RMS value of the signal. When a small ac signal is applied to the cell, the LC molecules tilt slightly without destroying the "adiabatic following" of the 90° twist. The effect of the tilt is a smaller birefringence, Δn. Thus, a small voltage can be used to tune into the minimum condition.

For each pixel/channel in the "on" state, an ac signal with a large RMS voltage $V_{on,rms}$ ($\approx 10 \, V_{RMS}$) is applied, since this voltage is not a function of channel wavelength or temperature.

Figure 3:
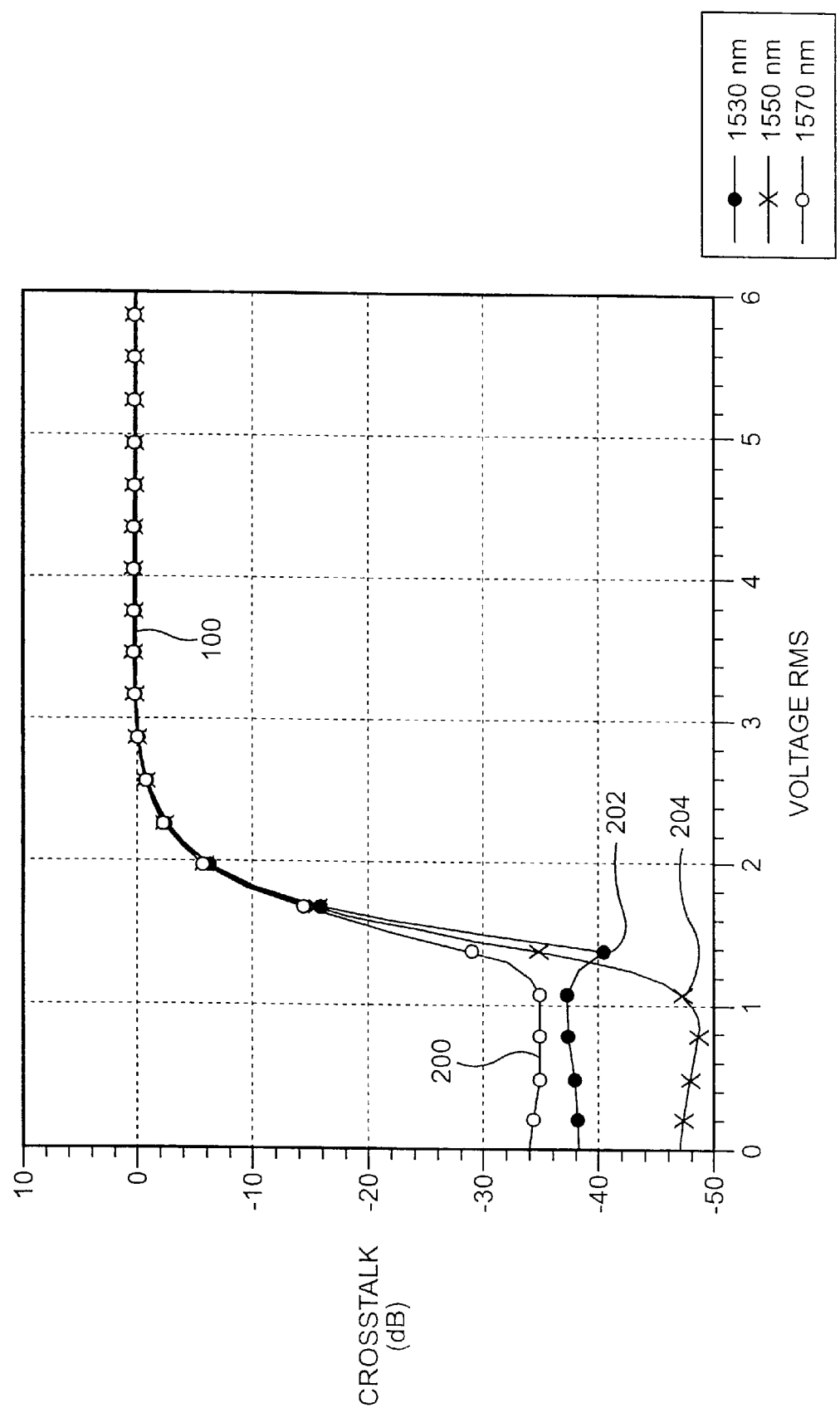
FIG. 3 is a plot of cross-talk versus voltage illustrating the importance of selecting a thickness of the LC cell for a minimum condition.

As embodied herein and depicted in FIG. 3, a plot of cross-talk versus voltage illustrating the importance of selecting a proper thickness for LC cell 20 is disclosed. Plot line 200 (1570 nm signal) illustrates an improperly designed LC cell. Because its thickness wasn't selected to cause a minimum condition to occur for the longest operating wavelength at a maximum temperature value just above the maximum operating temperature, no amount of electronic compensation will drive the cell into a minimum condition. Plot lines 202 (1530 nm signal) and 204 (1550 nm signal) illustrate the benefits of a properly designed LC cell 20. Plot line 202 is driven to a minimum condition at about 1.4 Vrms and plot line 204 is driven to a minimum condition at about 0.9 Vrms. FIG. 3 also illustrates the wavelength dependence of $V_{off,RMS}$ ($\lambda_n$, T).

Figure 4:
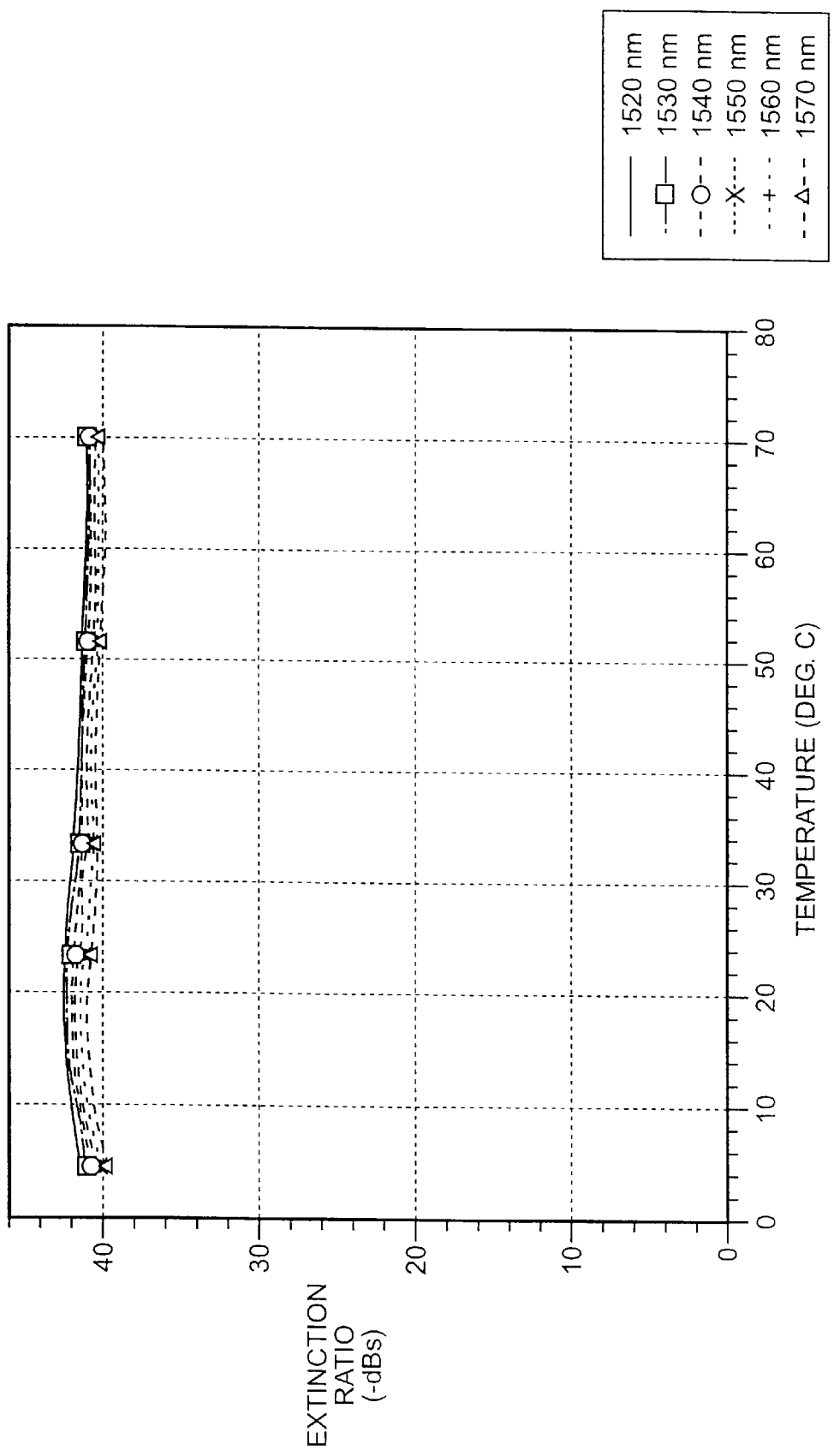
FIG. 4 is a plot of extinction ratio versus temperature illustrating the effects of temperature variation.
Figure 5:
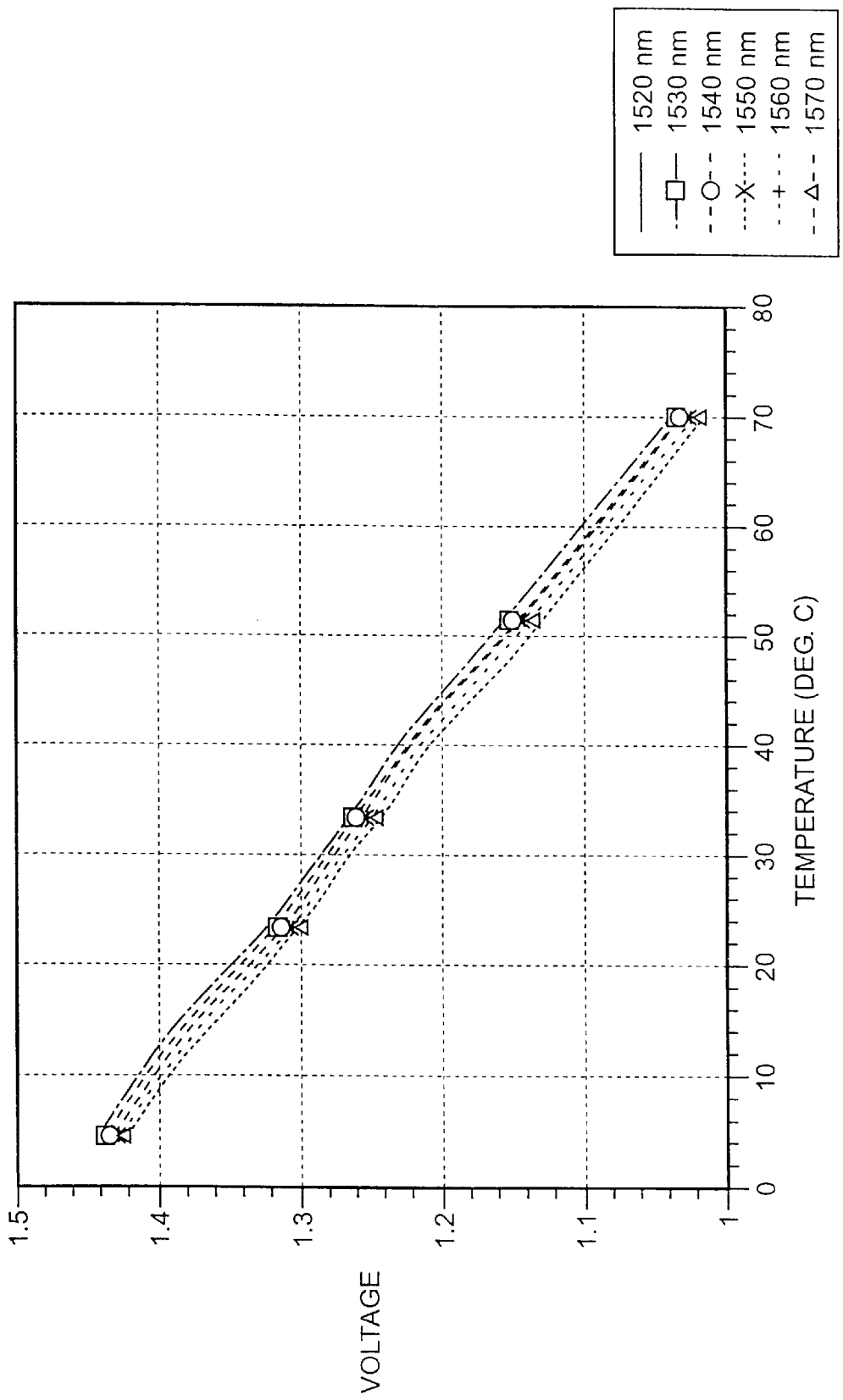
FIG. 5 is a plot of the bias voltages required to provide a −40 dB extinction ratio over a range of temperatures.

As embodied herein and depicted in FIGS. 4 and 5, measurements on LC cell 20 using only electrical compensation via amplitude modulation are disclosed. FIG. 4 is a plot of the peak extinction ratio in dBs (versus temperature at various wavelengths for LC cell 20 in which the thickness was chosen to give a first minimum at approximately 80° C. FIG. 5 provides a plot of the optimal "off" voltage as a function of temperature for various wavelengths required to maintain the −40 dB extiction ratio. Note that the RMS voltage must be accurate to within ±10 mV.

To obtain an extinction ratio that is greater than −40 dB, coarse temperature regulation is combined with the above discussed electrical compensation. In the present invention, the temperature is regulated over a limited region of approximately 6° C. and the thickness of the LC cell is selected to cause the minimum condition at the longest operating wavelength at the largest control temperature value. Again, this is important to ensure voltage tunability over all operating wavelengths.

As embodied herein and depicted in FIGS. 6–9, measurements of LC cell 20 using electrical compensation and thermal regulation are disclosed. Thus, performance improves when electrical compensation is performed in optimal temperature ranges.

Figure 6:
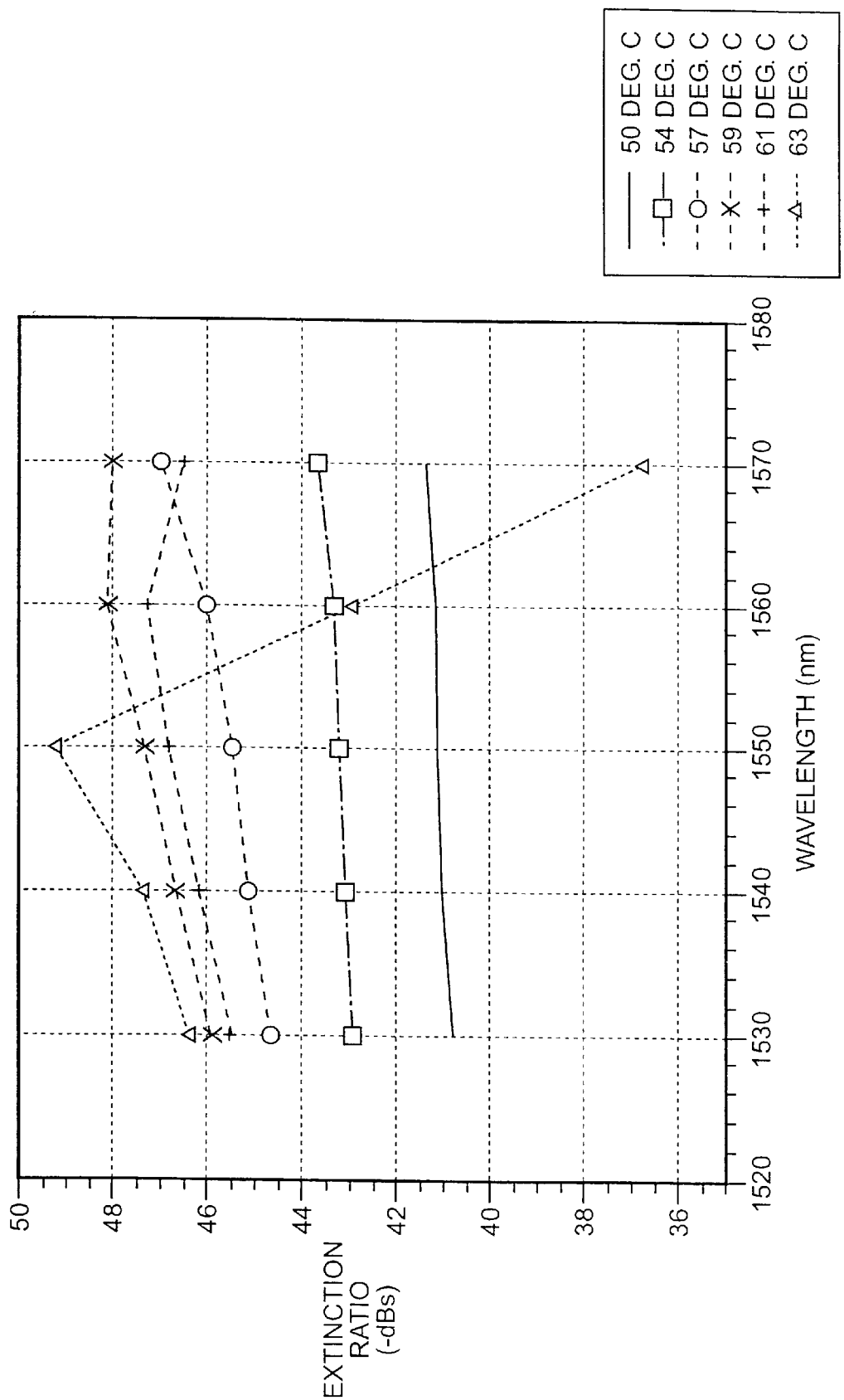
FIG. 6 is a plot of the extinction ratio when using voltage compensation for a range of wavelengths for various temperatures.

FIG. 6 is a plot of extinction ratio versus wavelength at various temperatures. The peak optimal temperature is approximately 61° C. As shown in FIG. 6, the extinction ratio drops drastically for the longer wavelengths at 63° C., because electrical compensation becomes ineffective.

Figure 7:
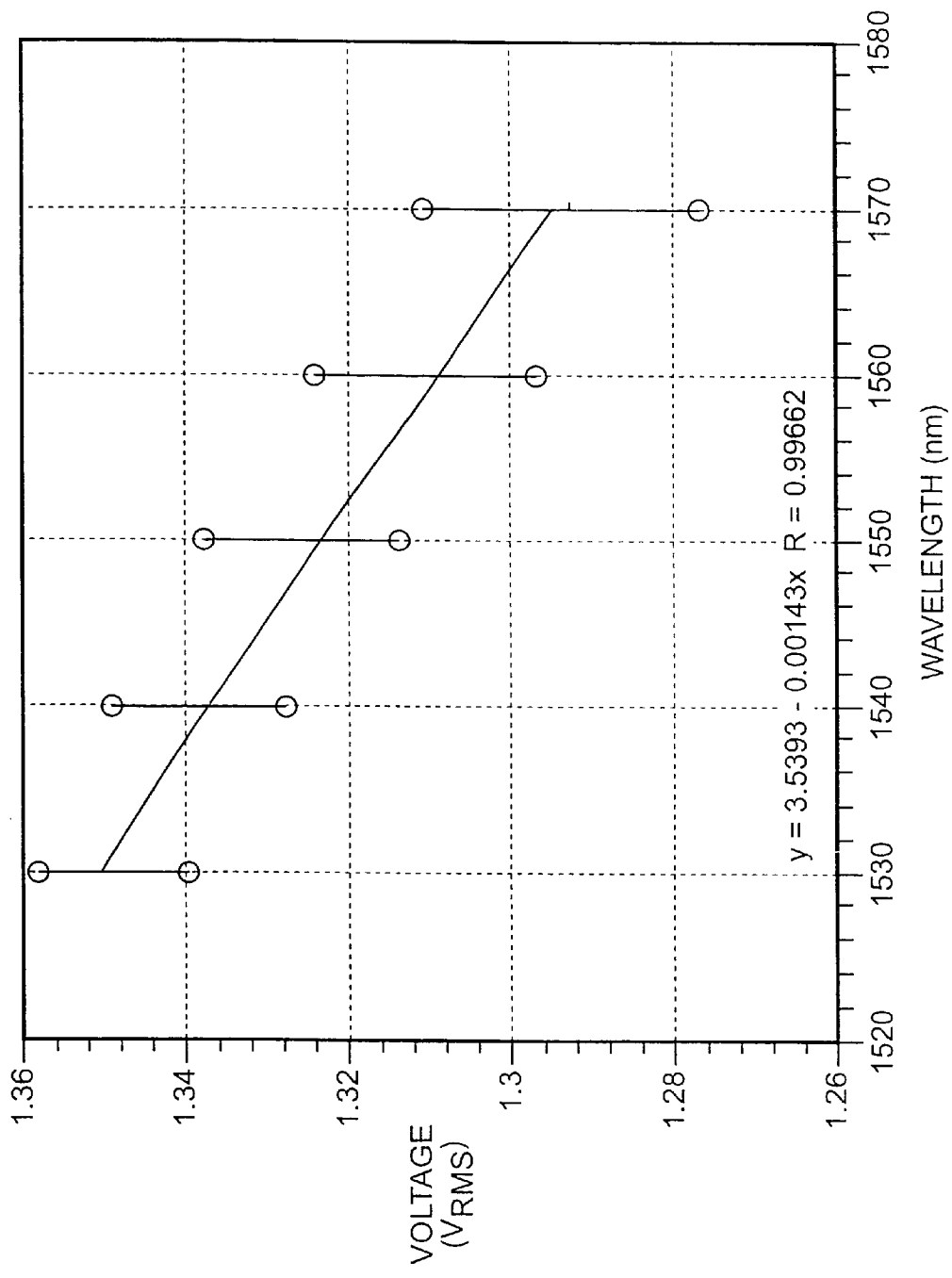
FIG. 7 is a plot of voltage versus wavelength for maintaining −40 dB extinction ratio at 54 Deg. C.°.
Figure 8:
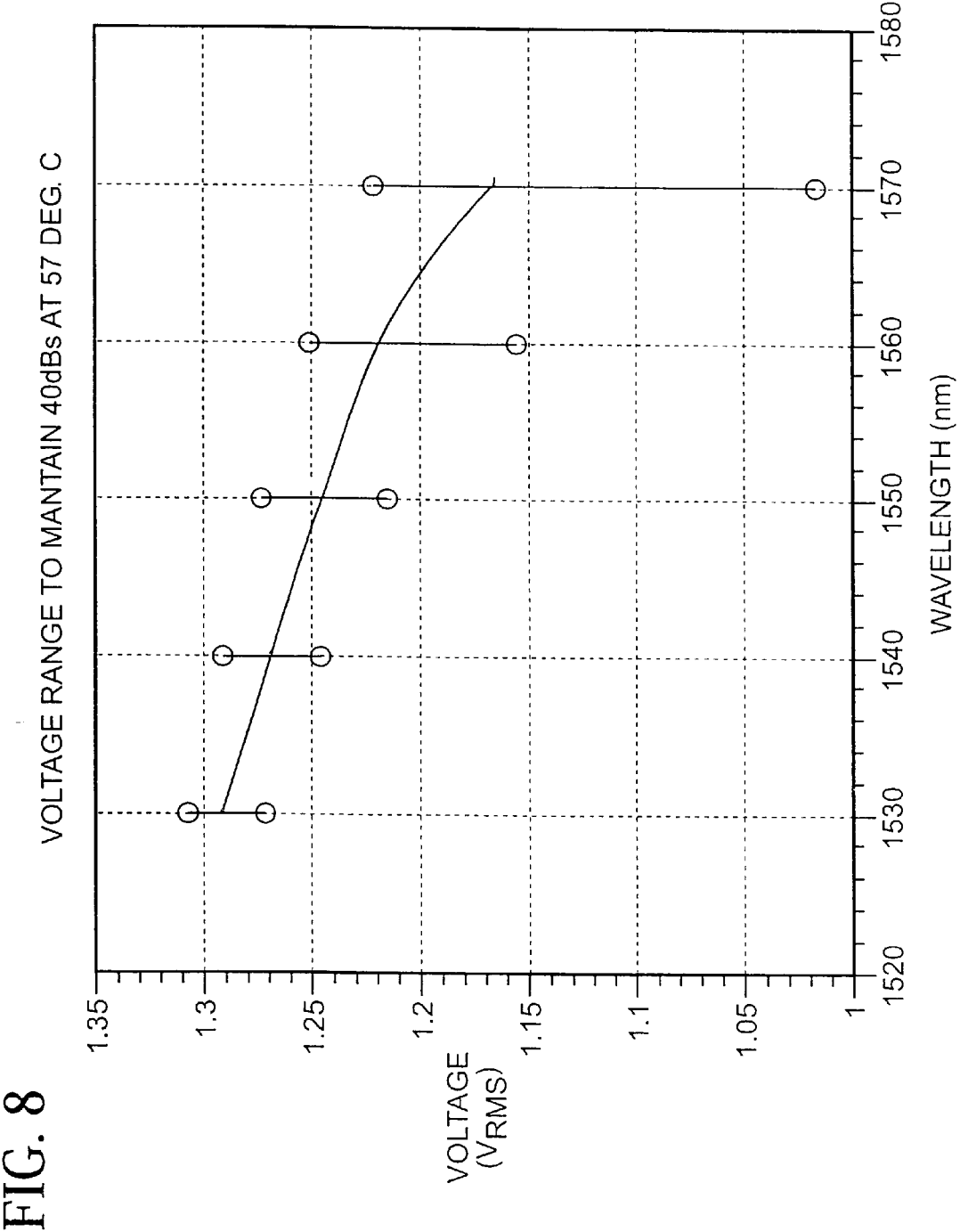
FIG. 8 is a plot of voltage versus wavelength for maintaining −40 dB extinction ratio at 57 Deg. C.°.
Figure 9:
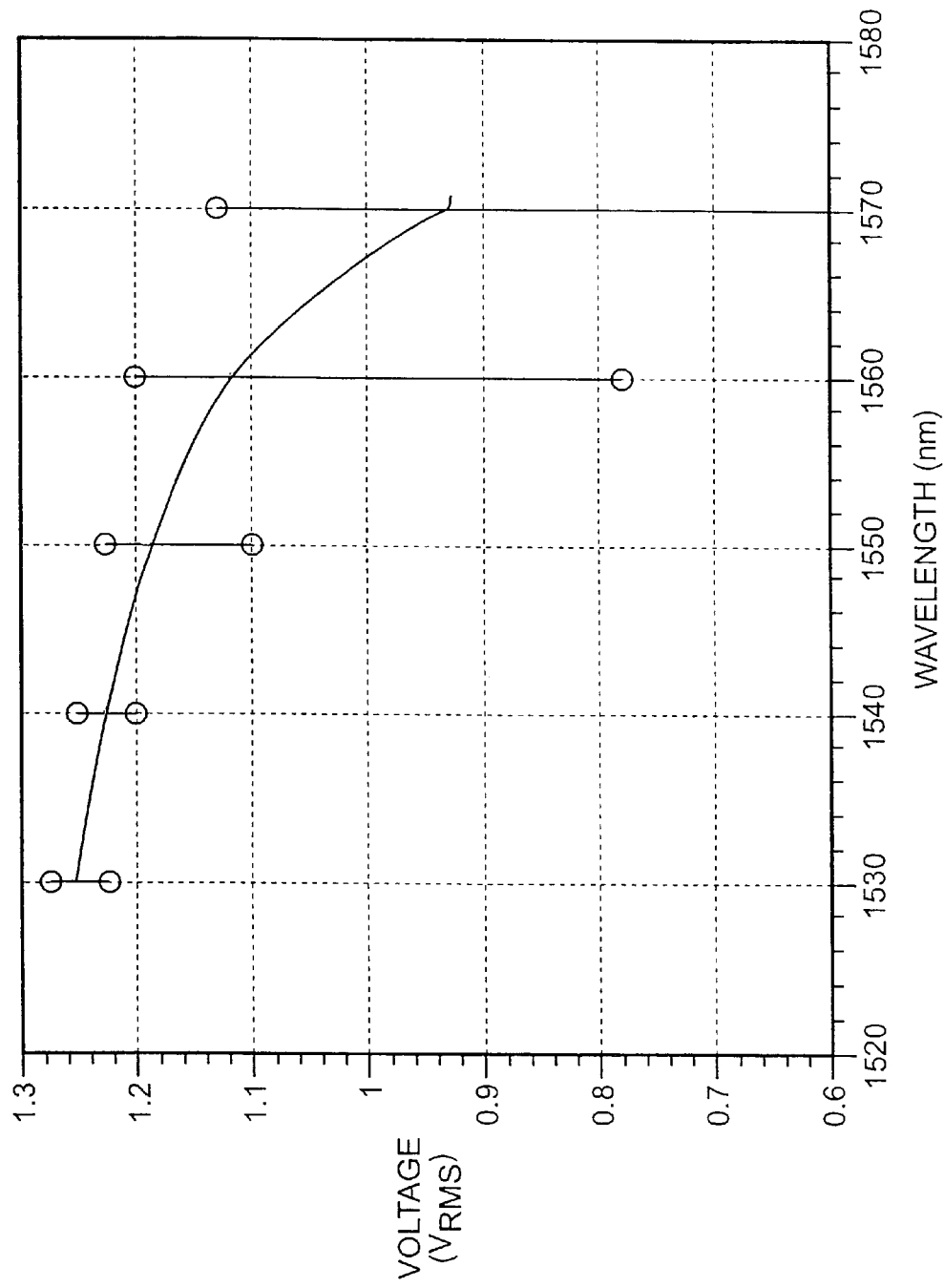
FIG. 9 is a plot of voltage versus wavelength for maintaining −40 dB extinction ratio at 59 Deg. C.°.

FIGS. 7–9 are high-low plots illustrating the voltage ranges required to maintain −40 dB extinction for 54° C., 57° C., and 50° C., respectively. In FIG. 7, the operating temperature is 54° C. The accuracy of the applied waveform must be ± 10 mV. In FIG. 8, the temperature is increased to 57° C. Note that the voltage range incerases as wavelength increases. In FIG. 9, the temperature is 59° C . As the wavelength increases to 1570 nm, the accuracy of the bias voltage is not a critical issue and as long as it is within 0.5 Volts a high extinction ratio (>40 dB) is maintained.

Figure 10:
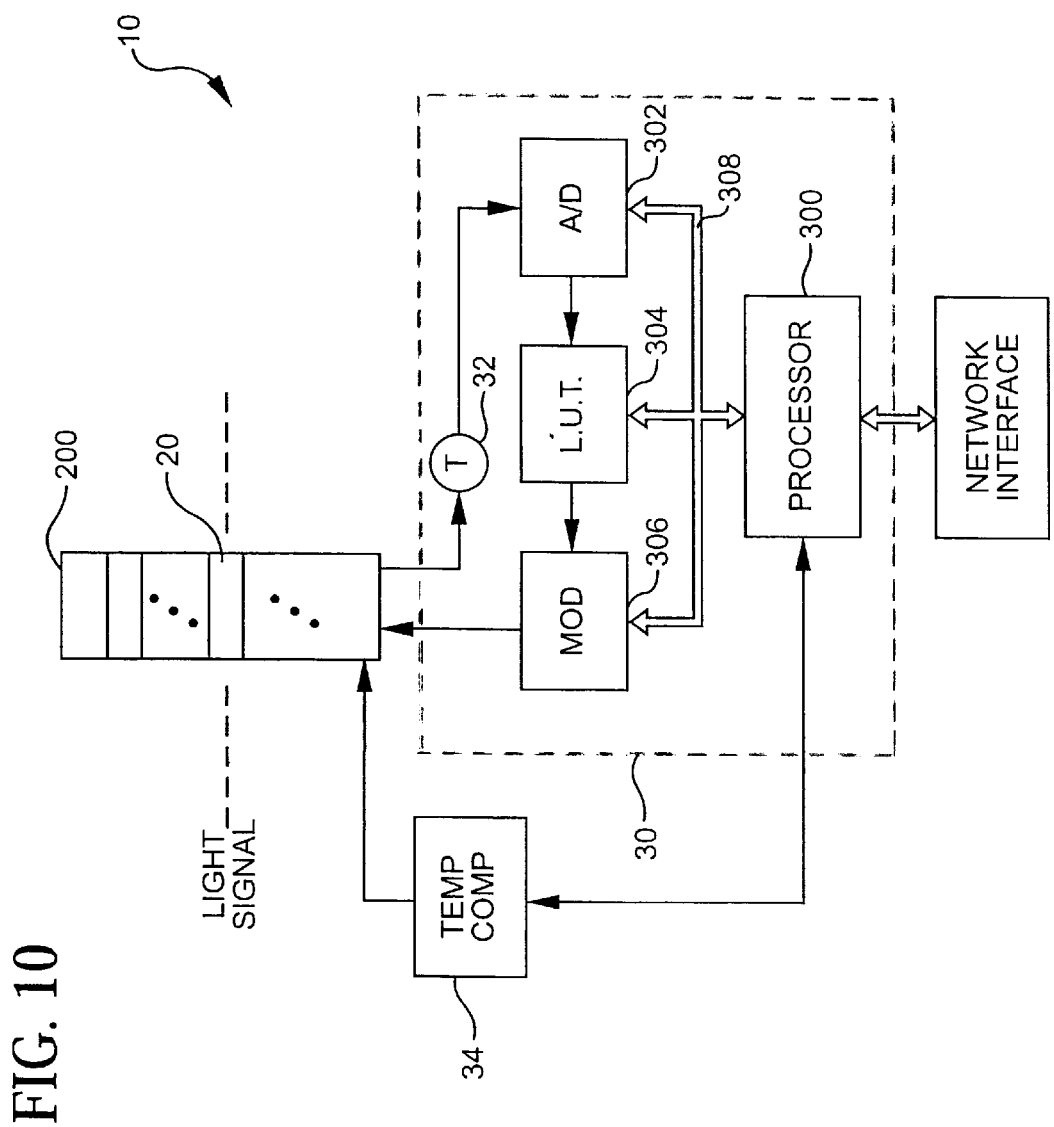
FIG. 10 is a schematic view depicting the electronic controller of the tunable liquid crystal switch in accordance with the first embodiment of the present invention.

As embodied herein and depicted in FIG. 10, tunable liquid crystal switch 10 includes liquid crystal device 200 connected to electronic controller 30. Electronic controller 30 is connected to temperature compensation module 34 which maintains LC device 200 at a predetermined ambient temperature. Electronic controller 30 is connected to a network interface. The network interface is not part of the present invention, but one of ordinary skill in the art will recognize that switch 10 receives switching and configuration information from a network via the network interface.

Electronic controller 30 includes temperature sensor 32 which is connected to LC device 200 and measures the ambient temperature of the operating environment of switch 10. Sensor 32 is connected to analog to digital (A/D) convertor 302. Analog temperature values are latched into A/D convertor 302 and converted into a digital word. One of ordinary skill in the art will recognize that these two functions can be combined into a single device. Also, these functions can also be incorporated in processor 300, as an on-chip function. A/D convertor 302 is connected to processor 300 supplying it with temperature information in a digital form. LUT 304 is connected to processor 300 and voltage modulator 306. The heart of controller 30 is processor 300 which controls the operation of A/D convertor 302, LUT 304, and voltage modulator 306 using system bus 308 which provides data, address, and control lines, along with a system clock signal. Processor 300 also controls temperature compensation module 34. Temperature compensation module 34 adjusts the operating temperature of liquid crystal device 200.

Look-up-table (LUT) 304 may be of any suitable well known type, but there is shown by way of example a random access memory (RAM). One of ordinary skill in the art will recognize that any type of digital memory may be used depending upon the amount of flexibility that is desired. For example, if an EEPROM is used, the $V_{off,RMS}$ ($\lambda_n$, T) values can be updated by retrieving the EEPROM from switch 10, erasing the contents, and reprogramming it with new values. A RAM on the other hand, can be repopulated dynamically. Processor 300 would merely write new values to each location in LUT 304. One of ordinary skill in the art will also recognize that LUT 304 need not be used at all. In an alternate embodiment, processor 300 can compute the $V_{off,RMS}$ ($\lambda_n$, T) values and directly control voltage modulator 306.

Processor 300 may be of any suitable well-known type, but there is shown by of example a 32-bit floating point embedded microprocessor equipped with a real-time operating system. Such devices are available from Motorola and other IC producers. One of ordinary skill in the art will recognize that a wide variety of microprocessors can be used based on the speed and processing power desired for the given application. One of ordinary skill in the art will also recognize that processor 300 can be implemented using an analog computer.

There are certain core functions that processor 300 must perform. Processor 300 receives and processes switching commands from the network interface and in turn relays the switch status to network control for monitoring purposes. Processor 300 controls the timing for each switching cell in LC device 200. As discussed above, processor 300 controls the voltage modulation for each cell by using the temperature values latched in A/D 302, along with the wavelength assigned to each cell, to select the LUT values used to drive modulator 306. As part of the monitoring function discussed above, processor 300 monitors the performance of device 200 by checking the extinction ratio. This is discussed in more detail below. As LC device 200 ages, the LUT values may need to be adjusted. Using its powerful processing capabilities and a real time operating system, processor 300 can repopulate LUT 304 periodically to maintain the performance characteristics of switch 10.

Voltage modulator 306 may be of any suitable type, but there is shown by way of example a pulse amplitude modulator (PAM) that provides the root-mean-square value of voltage necessary to drive liquid crystal cells 20. A pulse width modulator (PWM) can also be used. One of ordinary skill in the art will recognize that any modulator capable of delivering RMS bias voltages in the off-state to the LC cells 20 in LC device 200 can be used. A square wave, a sinusoidal wave or a bipolar pulse width modulated signal (PWM) may be used to drive liquid crystal cells 20. Modulator 306 must also provide the on-state switching voltage required to toggle each liquid crystal cell 20 in device 200 between an off-switch state and an on-switch state. Typically, the on-state voltage is approximately 10 volts and is independent of temperature and wavelength.

Liquid crystal device 200 may be of any suitable well known type, but there is shown by way of example, an array of twisted nematic liquid crystal cells 20. Array 200 is designed in accordance with the discussion presented above with respect to FIGS. 1–9. One of ordinary skill in the art will recognize that LC device 200 can also be fabricated using super twisted nematic cells. One of ordinary skill in the art will also recognize that LC device 200 may be implemented as a 1×N array or an M×N array of LC cells 20 depending on the complexity of switch 10. Thus, in a 1×N array, switch 10 supports a single network and an M×N array supports M-network layers. Each cell 20 in the array operates as a wavelength channel switch. Thus, each cell 20 in LC device 200 is used to rotate or not rotate the polarization state of a single-wavelength light signal depending on the switch state of the cell 20. As discussed above, the switch state of each cell 20 is controlled by processor 300. The bandwidth of these channels can be either 50 Ghz or 100 Ghz. As discussed above, without compensation, an LC cell 20 rotates a light signal by almost 90° when no power is applied. By appropriately designing LC device 200, each cell 20 can be tuned to a minimum condition in the off state by applying a small bias voltage.

Optical switch 10 operates as follows. Processor 300 controls the switching states of each cell 20 in LC device 200 according to network command. Voltage modulator 306 has an individually controllable connection to each cell 20 in LC device 200. Processor 300 supplies each controllable connection with a value from LUT 304 to drive each controllable connection in accordance with a network command.

As described above, the polarization state of an incident light signal is rotated in an "off" state. For each cell 20 in this switch state, processor 300 provides modulator 306 with the unique bias voltage value and each of these cells are driven to a minimum condition by perfecting the helical twist of the liquid crystal molecules in each of the cells to a near perfect 90°. Thus, the extinction ratio of each cell is driven over 40 dB. As discussed above, the bias voltages are typically less than 1.6 $V_{RMS}$ and are a function of both temperature and wavelength. One of ordinary skill in the art will recognize that these values can be changed dynamically by processor 300 as changes in the ambient temperature of switch 10 are detected. These values can also be changed if the wavelength assignments of the cells are changed.

For those channels that are not switched, processor 300 causes the voltage modulator 306 to apply an "on-state" voltage. The on-state voltage must be at least 6V to remove the helical twist formed by the liquid crystal molecules in the quiescent state. In this state, the cells transmit the incident signal without rotating the polarization state.

Figure 11:
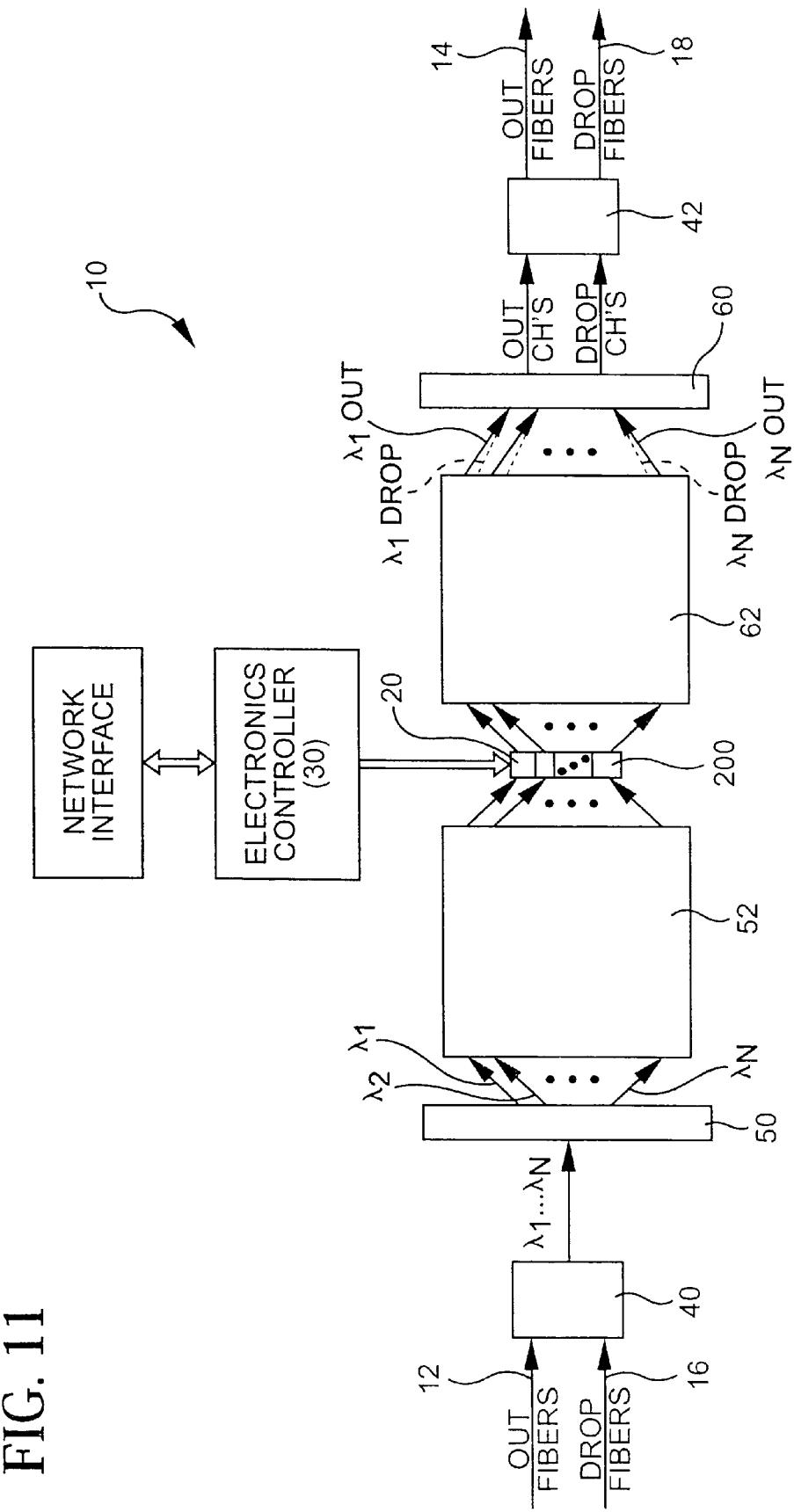
FIG. 11 is a schematic of a WSXC according to the first embodiment of the present invention.

In another embodiment of the invention, as embodied herein and as shown in FIG. 11, a wavelength selective cross-connect (WSXC) 10 is disclosed. Input fiber 12 and add fiber 16 are connected to input device 40 which includes collimators and beam separators. Input fiber 12 and add fiber 16 carry a multiplexed stream of wavelength channels that are collimated and split into their respective polarization components by device 40. The polarized signals are directed to demultiplexer 50 and separated into wavelength channels. Input birefringent optical system 52 directs each wavelength channel to its respective LC cell 20. As discussed above with respect to the first embodiment, electronic controller 30 controls each LC cell 20 individually to drive them into the minimum condition when in the off-state. The polarization state of the incident polarized beam is rotated by 90°. The cells 20 that are turned on do not rotate the light propagating through the channel. They are supplied with approximately 10 V rms, as described above. Output birefringent optical system 62 spatially displaces the channels that are rotated by LC cell 20. Birefringent optical system 62 does not spatially displace the wavelength channels that are not rotated. Both the spatially displaced channels and the non-displaced channels are multiplexed by multiplexer 60 into an output beam 600 and a drop beam 602. Output device 42 collimates and combines the beams, and directs them into the output fiber 14 and the drop fiber 18, respectively. Thus, each channel on input fiber 12 and add fiber 16 can be cross-connected to either output fiber 14 or drop fiber 18 with an intra-channel cross-talk below 40 dB.

As discussed above, one of ordinary skill in the art will also recognize that LC device 200 may be implemented as a 1×N array or an M×N array of LC cells 20 depending on the complexity of switch 10. In this alternate embodiment, input fiber 12 is replaced by M input fibers, where M is an integer. Output fiber 14 is replaced by M output fiber. Thus, each of the M input, M output fibers, M add fibers, and M drop fibers would correspond to one of the M-rows of LC matrix 200. Although not shown in FIG. 11, it is contemplated that any of the drop ports for any given row can be routed and fedback to any of the add ports for a given row. This would provide cross-connectivity between any of the M×N channels.

Figure 12:
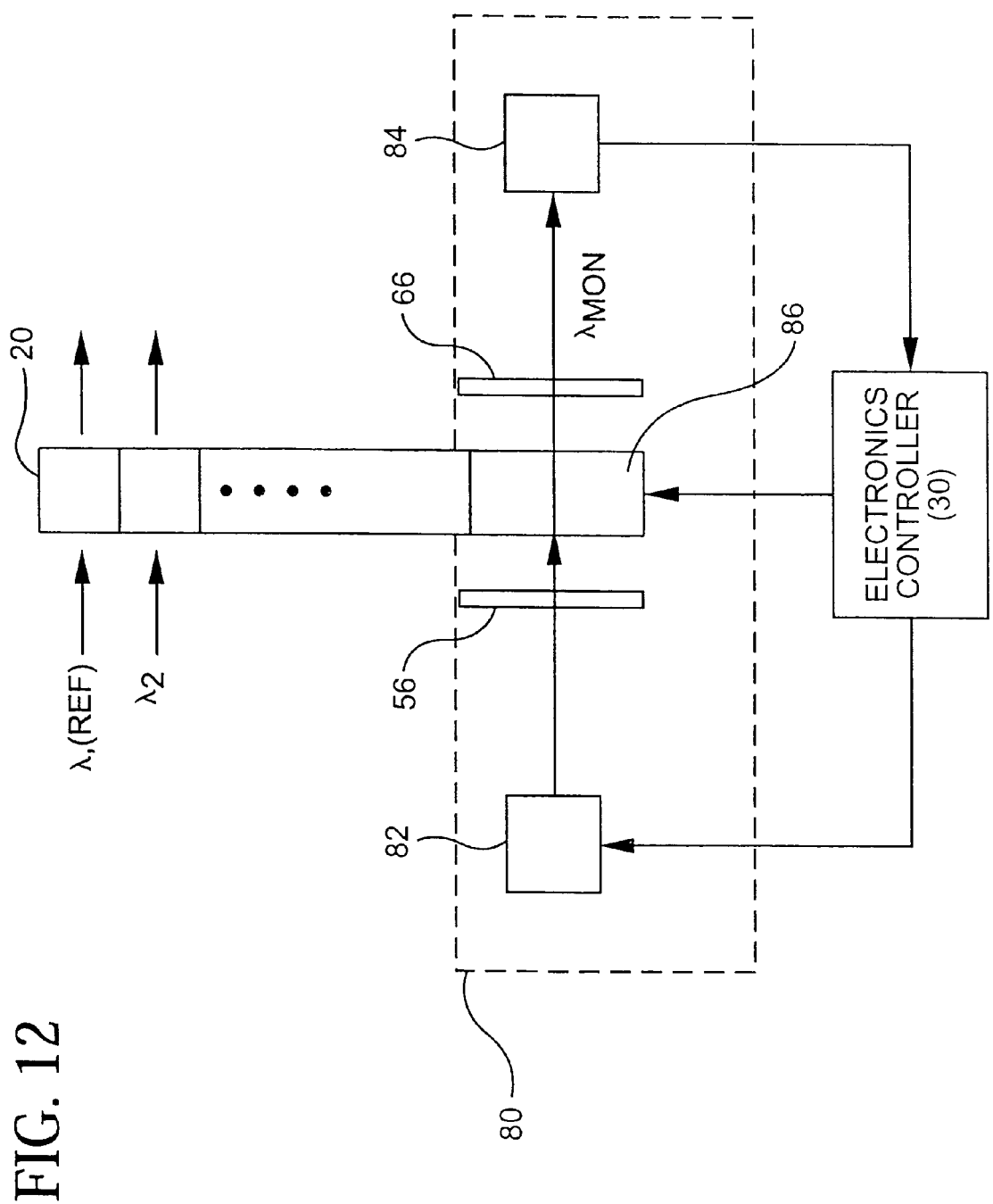
FIG. 12 is a schematic view of the optical monitor channel in accordance with a second embodiment of the present invention.

As embodied herein and depicted in FIG. 12, another alternative embodiment of the invention is disclosed. In this embodiment, electronics controller 30 includes an optical monitor 80. Monitor 80 includes monitor light source 82, polarizer 56, monitor LC channel 86, analyzer 66, and detector 84.

Monitor channel may be of any suitable type, but there is shown by way of example an LC cell of the type described above. However, in this embodiment the optical monitoring is provided using the "second" minimum of the LC cell 86. This significantly lowers the required wavelength for monitoring and thus lowers the cost of the optical source. For a 90° TN LC cell sandwiched between parallel polarizer, the extinction ratio is given by equations (1), (2) and (3), as discussed above. As discussed in equation (3), the values of integer m refer to the minimum conditions and must be closely maintained to achieve the low crosstalk needed in the WSXC. For instance, m=1 is the first minimum and m=2 is the second minimum. By maintaining high contrast on the monitor channel, high isolation can be maintained on the signal channels.

Light source 82 may be of any suitable type, but there is shown by way of example a laser diode that provides a light signal having a narrow line width. One of ordinary skill in the art will recognize the light source can be also constructed using an LED and a bandpass filter. In determining the required wavelength of the light source 82, one of the wavelength channels is used as a reference wavelength. In FIG. 12, $\lambda_1$ is depicted as the reference wavelength. One of ordinary skill in the art will recognize that any of the channel wavelengths can be used as the reference wavelength. As an example, the required wavelength for a monitor light source given the reference (signal) channel conditions of:

Reference Channel Wavelength, $\lambda_1=\lambda_{ref}=1550$ nm

Birefringence, $\Delta n_{ref}/\Delta n_{mon}=0.9$, $\Delta n_{ref}=0.1$

If the monitor wavelength is situated at the first minimum, than $\lambda_{mon}=\lambda_{ref}$. However, if the monitor wavelength is situated at the second minimum, we know from equation 3 that $$u_{ref} = \sqrt{3} = \frac{2d}{\lambda_{ref}}(\Delta n)_{ref} \text{ in which } m=1 \quad (4)$$

$$u_{mon} = \sqrt{15} = \frac{2d}{\lambda_{mon}}(\Delta n)_{mon} \text{ in which } m=2$$

Taking the ratio in equation 4, we can obtain the following relationship:

$$\frac{\lambda_{mon}}{\lambda_{ref}} = \sqrt{\frac{3}{15}\left(\frac{(\Delta n)_{mon}}{(\Delta n)_{ref}}\right)} \quad (5)$$

Thus, solving equation given the conditions above gives a monitor wavelength of $\lambda_{mon}=770$ nm. By providing feedback on contrast ratio at the monitor wavelength of 770 nm, one is effectively monitoring the signal channels. The remaining channels can be compensated through known look up tables or equations. For instance, the optimal compensation voltage as a function wavelength is shown in the experimental plot in FIG. 7.

Monitor detector 84 may be of any suitable type, but there is shown by way of example a PIN diode. One of ordinary skill in the art will recognize that an avalanche photodiode (APD) could also be used. However, PIN diodes are less expensive, less sensitive to temperature, and they require a lower reverse bias voltage than that of the APD.

In an alternate embodiment of the present invention, a monitor is installed at each pixel. In this embodiment, each liquid crystal cell 20 is elongated. A monitor detector 84 is disposed above or below the light path of the wavelength channel.

Monitor 80 operates as follows. Light source 82 emits light at monitor wavelength $\lambda_{mon}$. Polarizer 56 allows only one polarization component of the monitor light to pass. The monitor polarized light is incident on monitor channel 86. Channel 86 operates in the same way that the signal channels operate. If it is "off" the light will be rotated by adiabatic following. If it is "on" the light will not be rotated. Analyzer 66 is identical to polarizer 56 and only allows one polarization component to pass. Detector 84 measures the light exiting analyzer 66. One of ordinary skill in the art will recognize that if monitor channel 86 fails to rotate the incident monitor light by a perfect 90° when voltage compensation is applied, light will be incident on detector 84. Detector is connected to Processor 300 (connection not shown). Thus, optical monitor 80 provides feedback to processor 300 in electronic controller 30 (See FIG. 10). Processor 300 has the option of adjusting LUT 304 to change bias voltages, or temperature compensation module 34 to change the operating temperature. Processor 300 could adjust both of these factors.

The monitor 80 and control electronics 30 compensate for changes in LC device 20 due to aging. For example, extreme temperature cycles could result in a LC thickness variation causing the optimal temperature to shift. As a result, the compensation parameters needed to drive the various channels into a minimum condition must be adjusted. Monitor 80 provides extinction ratio monitoring. Thus, any increase in intra-channel cross-talk will be detected immediately and corrective measures will be implemented to maintain the low intra-channel cross-talk. In doing so, processor 300 performs a minimization routine. Referring to FIG. 3, the minimum condition curve may have moved due to aging. Thus, processor 300 will vary the off voltage to thereby find the minimum condition. Using FIG. 5, for example, processor 300 will then calculate the values for the remaining wavelength channels. If processor 300 cannot find the minimum condition, it would then signal an alarm that a catastrophic error has occurred.

One of ordinary skill in thart will recognize that the ability to reconfigure optical switch 10 as discussed above, provides for more sophisticated techniques of network diagnostics, maintenance and fault tolerance. With the monitoring function discussed above, the Network managers can be apprised of the condition of every switch in the Network. If a given switch 10 is out of tolerance, optical switch 10 can be reconfigured without taking it off line. The diagnostic function of switching and compensation electronics 30 also determines if the switch 10 is in an illegal state, or is experiencing either a catastrophic failure condition or merely a degraded performance condition. This type of warning is invaluable in fault tolerant switched rings or meshed networks. In the case where a catastrophic failure condition occurs, traffic is rerouted around the failed switch. In addition, the generated alarm is also used to issue a repair and/or replace order to maintenance personnel.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical device for directing a light signal comprising:
    a liquid crystal element for modulating the light signal, wherein said liquid crystal element is characterized by an extinction ratio when in an off-state; and
    a voltage controller connected to said liquid crystal element for supplying a bias voltage to said liquid crystal element in said off-state to drive said extinction ratio toward a minimum condition.

2. The optical device of claim 1, wherein the voltage controller varies the bias voltage in accordance with an ambient temperature of the optical device and a wavelength of the light signal to thereby drive the extinction ratio to the minimum condition.

3. The optical device of claim 2, wherein the liquid crystal element has a thickness "d" which causes the minimum condition to occur at a wavelength greater than the longest operating wavelength of the light signal and at a temperature greater than the maximum operating temperature of the optical device.

4. The optical device of claim 3, wherein the extinction ratio is defined as:

$$\eta = \frac{\sin^2\left(\frac{\pi}{2}\sqrt{1+u^2}\right)}{1+u^2}, \text{ and the minimum condition occurs when}$$

and the minimym condition occurs when $$\frac{\pi}{2}\sqrt{1+u^2} = m\pi,$$

for m, an integer, wherein, for a given wavelength λ and for a birefringence Δn of said liquid crystal element, u is given by:

$$u = 2\frac{d}{\lambda}\Delta n$$

where d is said thickness of said liquid crystal element.

5. The optical device of claim 1, wherein the extinction ratio is greater than 40 dB.

6. The optical device of claim 1, wherein the extinction ratio is greater than 50 dB.

7. The optical device of claim 1, wherein the liquid crystal element is a matrix of liquid crystal cells, and each of said liquid crystal cells modulates a respective one of a plurality of signal channels.

8. The optical device of claim 7, wherein the light signal includes a plurality of wavelengths, each of said plurality of wavelengths corresponds to one of the signal channels.

9. The optical device of claim 8, wherein the voltage controller further comprises:
  a voltage modulator connected to the matrix of liquid crystal cells, wherein said voltage modulator includes an independently controllable connection to each of the liquid crystal cells to thereby provide a cell bias voltage to drive the liquid crystal cell into a minimum condition;
  a look-up-table connected to said voltage modulator for supplying bias voltage values for each independently controllable connection, wherein said look-up-table stores bias voltage values as a function of wavelength and temperature for each wavelength and over an operating range of temperatures;
  a temperature sensor connected to the optical device for measuring an ambient temperature of the optical device; and
  a processor connected to said temperature sensor, said look-up-table and said voltage modulator, said processor continually monitors said ambient temperature and transfers said bias voltage values from said look-up-table to said voltage modulator.

10. The optical device of claim 9, wherein the minimum condition is an extinction ratio greater than 40 dB.

11. The optical device of claim 10, wherein the extinction ratio is greater than 50 dB.

12. The optical device of claim 9, further comprising a channel monitor for monitoring the extinction ratio of the liquid crystal element, said channel monitor including:
  a monitor switching cell in the matrix of liquid crystal switching cells;
  a monitor light source coupled to said monitor switching cell on a first side of said monitor switching cell, wherein said monitor light source propagates a monitor light signal through said monitor switching cell; and
  a detector coupled to a second side of the monitor switching cell, for detecting the monitor light signal and producing a monitor signal.

13. The optical device of claim 12, wherein the processor uses the monitor signal to determine an extinction ratio of the channel monitor.

14. The optical device of claim 12, wherein the processor uses the monitor signal to determine whether the voltage bias values correspond to the minimum condition.

15. The optical device of claim 14, wherein the processor adjusts the voltage bias values in the look-up-table in accordance with the monitor signal.

16. The optical device of claim 12, further comprising a temperature compensation module connected to the processor, wherein said temperature compensation module regulates the ambient temperature of the optical device under processor supervision.

17. The optical device of claim 16, wherein the processor uses the monitor signal when adjusting the ambient temperature of the optical device.

18. The optical device of claim 9, wherein the cell bias voltage is a root-mean-square voltage value.

19. The optical device of claim 18, wherein the cell bias voltage is an alternating current voltage.

20. The optical device of claim 19, wherein the cell bias voltage is a pulse amplitude modulated signal.

21. The optical device of claim 19, wherein the cell bias voltage is a square wave.

22. The optical device of claim 19, wherein the cell bias voltage is a sinusoidal wave.

23. The optical device of claim 19, wherein the cell bias voltage is a pulse width modulated signal.

24. The optical device of claim 8, further comprising:
  at least one input port for receiving the light signal from a network;
  at least one output port for transmitting an output light signal to said network;
  an input birefringent optical system connected to said at least one input port and the matrix of liquid crystal cells, said input birefringent optical system converts the light signal into the plurality of signal channels, wherein each of the liquid crystal cells switches one signal channel in accordance with a cell switch state to produce a signal channel output; and
  an output birefringent optical system connected to the matrix of liquid crystal cells, said output birefringent optical system multiplexes said signal channel outputs into either an orthogonal polarized output component or a parallel polarized output component based on said cell switch state, and directs said orthogonal polarized output component and said parallel polarized output component into said at least one output port in accordance with the polarization state of said orthogonal polarized output component and said parallel polarized output component.

25. The optical device of claim 24, wherein the input birefringent optical system splits the light signal into an orthogonal polarized component and a parallel polarized component, and demultiplexes said orthogonal polarized component and said parallel polarized component into the plurality of wavelengths.

26. The optical device of claim 25, wherein the at least one input port includes an input port and an add port, said add port including wavelength channels that are interleaved with the plurality of signal channels by the liquid crystal element and the input birefringent optical system.

27. The optical device of claim 24, wherein the at least one output port includes an output port and a drop port, said drop port including wavelength channels that are dropped from the plurality of signal channels by the liquid crystal element and the output birefringent optical system.

28. The optical device of claim 24, wherein the at least one input port includes N input ports, and the at least one output port includes N output ports, wherein N is an integer.

29. The optical device of claim 28, wherein the matrix is an N×M matrix, wherein M is an integer number of signal channels.

30. The optical device of claim 1, wherein the light signal is switched in accordance with a polarization state of the light signal.

31. The optical device of claim 30, wherein the bias voltage causes the liquid crystal element to rotate the polarization state of the light signal by a degree of rotation substantially equal to 90°.

32. The optical device of claim 31, wherein the liquid crystal element rotates the polarization state of the light signal by a degree of rotation not equal to 90° when no bias voltage is applied.

33. The optical device of claim 30, wherein the voltage controller supplies the liquid crystal element with an on-state voltage such that the liquid crystal element does not rotate the polarization state of the light signal.

34. The optical device of claim 33, wherein the on-state voltage is not a function of a wavelength of the light signal or a temperature of the optical device.

35. The optical device of claim 1, further comprising a channel monitor for monitoring the extinction ratio of the liquid crystal element, said channel monitor including:
   a monitor light source disposed on a first side of the liquid crystal element, for directing a monitor light signal through the liquid crystal element;
   a detector disposed on a second side of the liquid crystal element, for detecting the monitor light signal as the monitor light signal exits the liquid crystal element, wherein said detector produces a monitor output signal; and
   a processor connected to said detector, wherein said processor uses the monitor output signal to detect changes in at least one characteristic of the liquid crystal element.

36. The optical device of claim 35, wherein the processor drives the voltage controller and supplies the voltage controller with a predetermined bias voltage in accordance with the at least one characteristic, a wavelength of the light signal, and ambient temperature.

37. The optical device of claim 36, wherein the processor adjusts the bias voltage in response to detecting changes in the at least one characteristic of the liquid crystal element.

38. The optical device of claim 37, wherein the at least one characteristic includes a thickness variation of the liquid crystal element.

39. The optical device of claim 37, wherein the at least one characteristic includes a relationship between the extinction ratio, temperature and wavelength, due to aging of the liquid crystal element.

40. The optical device of claim 35, wherein the channel monitor further comprises:
   a temperature sensor for monitoring an ambient temperature of the optical device; and
   a temperature compensation module connected to the processor, wherein said temperature compensation module regulates said ambient temperature of the optical device under processor supervision.

41. A method of directing a light signal in an optical device, said optical device including a liquid crystal element for switching the light signal, said liquid crystal element being characterized by an extinction ratio when in an off-state, said method comprising the steps of:
   providing the liquid crystal element with a thickness that causes a minimum condition to occur at a maximum wavelength greater than the longest operating wavelength of the light signal and at a maximum temperature greater than a maximum operating temperature of the optical device; and
   supplying a bias voltage to the liquid crystal element in the off-state to drive the extinction ratio toward a minimum condition, wherein the wavelength of the light signal is smaller than the maximum wavelength and the ambient temperature is less than the maximum temperature.

42. The method of claim 41, wherein the liquid crystal element is a matrix of individually controllable liquid crystal cells for individually switching single wavelengths of the light signal.

43. The method of claim 42, wherein the light signal includes a plurality of wavelengths, and each of said plurality of wavelengths corresponds to one of the individually controllable liquid crystal cells.

44. The method of claim 42, the method further comprising the steps of:
   measuring an ambient temperature of the optical device;
   providing a look-up-table connected to said voltage modulator for supplying cell bias voltage values for each liquid crystal cell, wherein said look-up-table store bias voltage values as a function of wavelength and said ambient temperature; and
   providing a cell bias voltage to drive the liquid crystal cell into a minimum condition, wherein said cell bias voltage corresponds to the wavelength of the liquid crystal cell and said ambient temperature.

45. The method of claim 42, further comprising the steps of:
   directing a monitor light signal through a monitor liquid crystal cell, wherein said monitor liquid crystal cell is one of the individually controllable liquid crystal cells;
   directing a monitor light signal through a monitor liquid crystal cell, wherein said monitor liquid crystal cell is one of the individually controllable liquid crystal cells;
   detecting the monitor light signal as the monitor light signal exits the monitor liquid crystal cell to thereby produce a monitor output signal; and
   determining the extinction ratio of the monitor liquid crystal cell from the monitor output signal.

46. The method of claim 45, further comprising the steps of:
   evaluating the monitor output signal to detect changes in at least one characteristic of the liquid crystal element when the extinction ratio of the monitor output signal exceeds a predetermined level; and
   adjusting the bias voltage values in the look-up-table in accordance with said detected changes.

47. The method of claim 46, wherein the step of adjusting further comprises the steps of:
   adjusting the cell bias voltage of monitor liquid crystal cell to find a minimum condition; and
   adjusting all of the individually controllable liquid crystal cells in accordance with said minimum condition.

48. The method of claim 47, wherein the step of adjusting further comprises a step of signalling a catastrophic failure condition when the monitor liquid crystal cell cannot be adjusted into the minimum condition.

49. A method of fabricating an optical device for directing a light signal, said method comprising the steps of:
   providing a liquid crystal element for switching the light signal, said liquid crystal element has a thickness "d"

which causes a minimum condition of an extinction ratio to occur at a wavelength greater than a longest operating wavelength of the light signal and at a temperature greater than a maximum operating temperature of the optical device; and providing a voltage controller connected to said liquid crystal element, wherein said voltage controller supplies a bias voltage to said liquid crystal element in said off-state to drive said extinction ratio toward said minimum condition for operating wavelengths shorter than said longest operating wavelength, and for temperatures lower than said maximum operating temperature.

50. The method of fabricating an optical device of claim 49, wherein the extinction ratio is defined as:

$$\eta = \frac{\sin^2\left(\frac{\pi}{2}\sqrt{1+u^2}\right)}{1+u^2}, \text{ and the minimum condition occurs when}$$

and the minimum condition occurs when $$\frac{\pi}{2}\sqrt{1+u^2} = m\pi,$$

for m, an integer, herein, for a given wavelength $\lambda$ and for a birefringence $\Delta n$ of said liquid crystal element, u is given by:

$$u = 2\frac{d}{\lambda}\Delta n$$

where d is said thickness of said liquid crystal element.

51. The method of fabricating an optical device of claim 49, wherein the step of providing a liquid crystal cell further comprises providing multiple liquid crystal cells arranged to form a matrix of liquid crystal cells, and wherein the step of providing a voltage controller further comprises the steps of:

providing a voltage modulator connected to the matrix of liquid crystal cells, wherein said voltage modulator includes an independently controllable connection to each of the liquid crystal cells to thereby provide a cell bias voltage to drive the liquid crystal cell into a minimum condition;

providing a look-up-table connected to said voltage modulator for supplying bias voltage values for each independently controllable connection, wherein said providing a processor connected to said temperature sensor, said look-up-table and said voltage modulator, said processor continually monitors said ambient temperature and transfers said bias voltage values from said look-up-table to said voltage modulator.

52. The method of fabricating an optical device of claim 49, further comprising the step of providing a channel monitor for monitoring the extinction ratio of the liquid crystal element.

53. The method of fabricating an optical device of claim 52, wherein the step of providing a channel monitor further comprises the steps of:

providing a monitor light source disposed on a first side of the liquid crystal element, for directing a monitor light signal through the liquid crystal element;

providing a detector disposed on a second side of the liquid crystal element, for detecting the monitor light signal as the monitor light signal exits the liquid crystal element, wherein said detector produces a monitor output signal; and providing a processor connected to said detector, wherein said processor uses the monitor output signal to detect changes in at least one characteristic of the liquid crystal element.

54. The method of fabricating an optical device of claim 49, further comprising the steps of:

providing a temperature sensor for monitoring an ambient temperature of the optical device; and providing a temperature compensation module connected to a processor, wherein said temperature compensation module regulates said ambient temperature of the optical device under processor supervision.

55. The method of fabricating the optical device of claim 49 wherein the step of providing a liquid crystal cell further comprises providing multiple liquid crystal cells arranged to form a matrix of liquid crystal cells, the method further comprising the steps of:

providing at least one input port for receiving the light signal from a network;

providing at least one output port for transmitting an output light signal to said network;

providing an input birefringent optical system connected to said at least one input port and the matrix of liquid crystal cells, said input birefringent optical system converts the light signal into a plurality of signal channels, wherein each of the liquid providing at least one output port for transmitting an output light signal to said network;

providing an input birefringent optical system connected to said at least one input port and the matrix of liquid crystal cells, said input birefringent optical system converts the light signal into a plurality of signal channels, wherein each of the liquid crystal switch cells switches one signal channel in accordance with a cell switch state to produce a signal channel output; and providing an output birefringent optical system connected to the matrix of liquid crystal cells, said output birefringement optical system multiplexes said signal channel outputs into either an orthogonal polarized output component or a parallel polarized output component based on said cell switch state, and directs said orthogonal polarized output component and said parallel polarized output component into said at least one output port in accordance with the polarization state of said orthogonal polarized output component and said parallel polarized output component.

56. The method of fabricating the optical device of claim 55, wherein the input birefringent optical system splits the light signal into an orthogonal polarized component and a parallel polarized component, and demultiplexes said orthogonal polarized component and said parallel polarized component into the plurality of wavelengths.

57. The method of fabricating the optical device of claim 55, wherein the at least one input port includes an input port and an add port.

58. The method of fabricating the optical device of claim 55, wherein the at least one output port includes an output port and a drop port.

59. The method of fabricating the optical device of claim 55, wherein the at least one inport port includes N input ports, and the at least one output port includes N output ports, wherein N is an integer.

60. The method of fabricating the optical device of claim 59, wherein the optical device is adapted for use with N input fibers each having M signal channels where N and M are integers, and wherein the matrix is an N×M matrix.

61. An optical device for directing a light signal comprising:
- a liquid crystal element for modulating the light signal, wherein said liquid crystal element is characterized by an extinction ratio when in an off-state; and
- a controller connected to said liquid crystal element for adjusting at least one parameter of said liquid crystal element in said off-state to drive said extinction ratio toward a minimum condition.

62. The optical device of claim 61, wherein the at least one parameter is a bias voltage.

63. The optical device of claim 62, wherein the at least one parameter is an ambient temperature.

* * * * *

UNITED STATES PATENT AND TRADEMARK OFFICE
CERTIFICATE OF CORRECTION

PATENT NO. : 6,567,202 B2
DATED : May 20, 2003
INVENTOR(S) : Lindquist Robert G. et al.

It is certified that error appears in the above-identified patent and that said Letters Patent is hereby corrected as shown below:

Column 15,
Line 49, claim 51 should read as follows:
51. The method of fabricating an optical device of claim 49, wherein the step of providing a liquid crystal cell further comprises providing multiple liquid crystal cells arranged to form a matrix of liquid crystal cells, and wherein the step of providing a voltage controller further comprises the steps of:
   providing a voltage modulator connected to the matrix of liquid crystal cells, wherein said voltage modulator includes an independently controllable connection to each of the liquid crystal cells to thereby provide a cell bias voltage to drive the liquid crystal cell into a minimum condition;
   providing a look-up-table connected to said voltage modulator for supplying bias voltage values for each independently controllable connection, wherein said look-up-table stores bias voltage values as a function of wavelength and temperature for each wavelength and over an operating range of
temperatures;
   providing a temperature sensor connected to the optical device for measuring an ambient temperature of the optical device; and
   providing a processor connected to said temperature sensor, said look-up-table and said voltage modulator, said processor continually monitors said ambient temperature and transfers said bias voltage values from said look-up-table to said voltage modulator.

Line 15, claim 55 should read as follows:
55. The method of fabricating the optical device of claim 49 wherein the step of providing a liquid crystal cell further comprises providing multiple liquid crystal cells arranged to form a matrix of liquid crystal cells, the method further comprising the steps of:
providing at least one input port for receiving the light signal from a network;
   providing at least one output port for transmitting an output light signal to said network;
   providing an input birefringent optical system connected to said at least one input port and the [liquid crystal] matrix of liquid crystal cells, said input birefringent optical system converts the light signal into a plurality of signal channels, wherein each of the liquid crystal switch cells switches one signal channel in accordance with a cell switch state to produce a signal channel output; and

UNITED STATES PATENT AND TRADEMARK OFFICE
CERTIFICATE OF CORRECTION

PATENT NO. : 6,567,202 B2
DATED : May 20, 2003
INVENTOR(S) : Lindquist Robert G. et al.

It is certified that error appears in the above-identified patent and that said Letters Patent is hereby corrected as shown below:

Column 16, (cont.)
    providing an output birefringent optical system connected to the matrix of liquid crystal cells, said output birefringement optical system multiplexes said signal channel outputs into either an orthogonal polarized output component or a parallel polarized output component based on said cell switch state, and directs said orthogonal polarized output component and said parallel polarized output component into said at least one output port in accordance with the polarization state of said orthogonal polarized output component and said parallel polarized output component.

Column 11,
Line 1, please remove the text from the first line.

Column 14,
Line 22, please change "to said" to -- to a --
Line 34-36, please remove text in lines 34 through 36

Column 15,
Line 18, please remove the text from line 18

Signed and Sealed this

Tenth Day of August, 2004

JON W. DUDAS
*Acting Director of the United States Patent and Trademark Office*